United States Patent
Sugaya

(10) Patent No.: US 6,961,568 B2
(45) Date of Patent: Nov. 1, 2005

(54) WIRELESS COMMUNICATION METHOD, WIRELESS COMMUNICATION SYSTEM, AND WIRELESS COMMUNICATION APPARATUS

(75) Inventor: Shigeru Sugaya, Kanagawa (JP)

(73) Assignee: Sony Corporation, Tokyo (JP)

( * ) Notice: Subject to any disclaimer, the term of this patent is extended or adjusted under 35 U.S.C. 154(b) by 498 days.

(21) Appl. No.: 10/163,965

(22) Filed: Jun. 6, 2002

(65) Prior Publication Data

US 2002/0187783 A1    Dec. 12, 2002

(30) Foreign Application Priority Data

Jun. 8, 2001    (JP) ........................... P2001-174598

(51) Int. Cl.[7] .............................................. H04Q 7/20
(52) U.S. Cl. ................ 455/435.1; 455/450; 455/452.1; 370/329; 370/350; 370/509; 370/313; 370/314
(58) Field of Search .............................. 455/450, 452.1, 455/517, 509, 435.1; 370/329, 465, 345, 370/278, 311, 350, 509, 313, 314

(56) References Cited

U.S. PATENT DOCUMENTS

| | | | | |
|---|---|---|---|---|
| 5,278,835 A | * | 1/1994 | Ito et al. ...................... | 370/311 |
| 5,396,496 A | * | 3/1995 | Ito et al. ...................... | 370/314 |
| 5,448,570 A | * | 9/1995 | Toda et al. ................... | 370/337 |
| 5,629,975 A | * | 5/1997 | Tiedemann et al. ....... | 455/435.1 |
| 5,862,132 A | * | 1/1999 | Blanchard et al. .......... | 370/342 |
| 5,884,171 A | * | 3/1999 | Tanabe et al. .............. | 455/434 |
| 5,903,618 A | * | 5/1999 | Miyake et al. .............. | 375/356 |
| 6,011,784 A | * | 1/2000 | Brown et al. ............... | 370/329 |
| 6,016,428 A | * | 1/2000 | Diachina et al. .......... | 455/435.1 |
| 6,594,241 B1 | * | 7/2003 | Malmlof ..................... | 370/329 |
| 6,597,683 B1 | * | 7/2003 | Gehring et al. ............. | 370/348 |
| 6,738,638 B1 | * | 5/2004 | Moulsley .................... | 455/517 |
| 6,804,542 B1 | * | 10/2004 | Haartsen ..................... | 455/574 |

* cited by examiner

Primary Examiner—William Trost
Assistant Examiner—Sharad Rampuria
(74) Attorney, Agent, or Firm—Jay H. Maioli

(57) ABSTRACT

A wireless communication system that forms a personal area network and that includes a control station and a communication apparatus. The control station and the communication apparatus perform a connection confirmation process. A connection confirmation period that constitutes a connection cycle is variable for each communication apparatus. When the connection confirmation period arrives each communication apparatus sends connection confirmation information to the control station.

11 Claims, 8 Drawing Sheets

WIRELESS COMMUNICATION METHOD, WIRELESS COMMUNICATION SYSTEM, AND WIRELESS COMMUNICATION APPARATUS

BACKGROUND OF THE INVENTION

1. Field of the Invention

The present invention relates to wireless communication methods, wireless communication systems, and wireless communication apparatuses.

2. Description of the Related Art

In a typical method for confirming a connection in a known small-scale network, an apparatus entering the network performs association processing with an apparatus functioning as a control station of the network, thereby enabling the apparatus to enter the corresponding network. After the association processing is completed, generally the apparatus is always regarded as being connected to the network. When the apparatus is disconnected from the corresponding network, disassociation processing is activated, thereby performing disassociation processing while recognizing the apparatus to be disconnected.

The association/disassociation processing is defined as an efficient method in a wired connection environment in which the existence of a terminal can be easily confirmed.

As a method for confirming an always-on access state, the control station of the network periodically exchanges predetermined information with each terminal, thereby sequentially monitoring the access state of each terminal.

Japanese Unexamined Patent Application Publication No. 11-251992 discloses the following method. In this method, a frame period is set to predetermined time, and connection links among all communication apparatuses in a network are confirmed using part of the frame period. Accordingly, a topology map of the overall network is constructed. The method described in Japanese Unexamined Patent Application Publication No. 11-251992 provides an area in which each communication apparatus forming the network sends a signal in each predetermined frame period. As long as each communication apparatus exists in the network, each communication apparatus sends a signal. Accordingly, the method can immediately detect a communication apparatus that no longer exists in the network.

FIG. 8 shows an example of a frame structure of a known connection confirmation method.

Referring to FIG. 8, a transmission frame period 45 is defined between a frame start packet (FSP) 41 and an FSP 43. Using a partial area of the frame period, each communication apparatus forming the network sends "connection confirmation information" to the control station. Accordingly, the connection status of each communication apparatus can be confirmed.

A station synch (SS) 42 and an SS 44 are divided into a plurality of small areas so that the connection confirmation information from each communication apparatus may not conflict with the other information. One small area is allocated to each communication apparatus. Each communication apparatus sends the connection confirmation information using the corresponding small area.

With this arrangement, all communication apparatuses send the "connection confirmation information" in each frame. If the frame period is short, such as a few milliseconds, the processing becomes redundant.

In the connection confirmation method in the known small-scale network, a communication apparatus that has completed association processing is regarded as being connected to the network. When the communication apparatus is disconnected from the network, the existence of the communication apparatus cannot be detected. Unlike a wired connection environment, it is necessary in a wireless connection environment to manage the existence of a communication apparatus by using a wireless connection. Thus, there is no means for the control station to easily detect the operating state of each terminal.

For example, a terminal station completes association processing and hence is regarded as being connected to the network. If for some reason the power supply to the terminal station is cut off, disassociation processing cannot be activated by the corresponding communication apparatus. Thus, the control station of the network cannot detect that the communication apparatus is disconnected from the network.

In order to solve this problem, as described in the foregoing Japanese Unexamined Patent Application Publication No. 11-251992, the following method is proposed. In, this method, the control station receives a signal transmitted on a relatively periodical basis from the terminal station. Having received the signal, the control station detects that the terminal station is connected to the network. In this method, a signal for confirming connection is required to be transmitted in each frame. If the frame period is set to a short period of time, such as a few milliseconds, the connection status is confirmed in each such short period. The connection confirmation in each such short period disagrees, in terms of time, with the time required for a human sense to determine connection/disconnection, which requires approximately a few seconds.

Generally, the known connection status confirming method confirms connection on the same periodical basis irrespective of the operating state of each communication apparatus forming the network. Thus, a sleeping communication apparatus must be activated on a predetermined periodical basis. In other words, the operating states of communication apparatuses forming the network differ from one communication apparatus to another. For a communication apparatus that does not need to transmit information, it is impossible to prolong a connection confirmation period in which connection confirmation is performed with the control station.

SUMMARY OF THE INVENTION

In order to solve the foregoing problems, it is an object of the present invention to provide a method for confirming a connection status between a control station of a wireless network and a communication apparatus on a predetermined periodical basis. In this method, the communication apparatus existing in the network always sends information for confirming the existence thereof to the control station before a predetermined period of time passes, whereby it can be confirmed that the corresponding communication apparatus exists in the network.

The predetermined period during which the connection status between the control station and the communication apparatus is confirmed can be set to, for example, a few hundreds of milliseconds.

It is another object of the present invention to provide a method for defining the time length of a plurality of frame periods as a single connection cycle and for sending connection confirmation information to the control station once in each connection cycle.

It is another object of the present invention to provide a method for confirming the connection status between the control station of the wireless network and the communication apparatus in which a frame period is set to a variable length for each communication apparatus in accordance with the network configuration status.

A period in which the control station and the terminal perform connection confirmation can be set to an integral multiple of a reference frame period. Accordingly, the connection confirmation control can be facilitated.

When sending "connection confirmation information" to the control station for performing connection confirmation, the communication apparatus may transmit "channel allocation request information" instead of transmitting the "connection confirmation information".

In order to achieve the foregoing objects, the present invention has the following features.

According to a first aspect of the present invention, a wireless communication method for performing connection confirmation between a control station and at least one wireless communication apparatus is provided. The wireless communication method includes the steps of determining, by the wireless communication apparatus, an interval of transmitting connection confirmation information; and transmitting, by the wireless communication apparatus, the connection confirmation information to the control station by using a predetermined area of a transmission frame. The interval of transmitting the connection confirmation information is changed in accordance with the operating state of the wireless communication apparatus.

According to a second aspect of the present invention, a wireless communication apparatus functioning as a control station of a wireless network is provided. The wireless communication apparatus includes a wireless communication unit for transmitting a signal for identifying the wireless network and for receiving a signal from a wireless communication apparatus belonging to the wireless network; a timing unit for timing a predetermined time interval; and an information storage unit for storing the predetermined time interval, which is a threshold for determining whether or not a connection is established, for each wireless communication apparatus included in the wireless network. The predetermined time interval is variable.

According to a third aspect of the present invention, a wireless communication apparatus for performing connection confirmation with a control station is provided. The wireless communication apparatus includes a wireless communication unit for receiving a signal from the control station and for transmitting connection confirmation information to the control station by using a predetermined area of a transmission frame; and a timing unit for timing a predetermined time interval. The predetermined time, interval is variable in accordance with the operating state of the wireless communication apparatus.

According to the present invention, the connection status between a control station and a communication apparatus in a wireless network can be confirmed on a predetermined periodical basis. It is thus possible to easily detect a communication apparatus disconnected from the network.

By performing connection confirmation between the control station and a terminal in every period corresponding to the time required for a human sense to determine connection/disconnection, a network management method, which is more suitable for actual use, can be achieved.

By using an area specifically allocated to each communication apparatus as an area in which connection confirmation information is transmitted, it is possible to prevent connection confirmation information sent by a plurality of communication apparatuses from conflicting with each other.

Since each communication apparatus uses an area in which a channel allocation request is sent to transmit connection confirmation information, the connection confirmation information is transmitted only if no channel allocation request information is sent. When the control station receives the channel allocation request information, the control station can confirm that the communication apparatus is connected. Accordingly, the amount of unnecessary information to be transmitted can be reduced.

Since a period in which the connection status is confirmed is variable for each terminal, the connection status can be confirmed in accordance with the operating state of each terminal.

Since the period in which connection confirmation is performed is prolonged, the power consumption can be reduced.

According to the present invention, the interval of sending connection confirmation information can be changed in accordance with the operating state of each communication apparatus forming the network. In other words, it is necessary for a communication apparatus that is transmitting information to immediately reflect a change in the network status. In contrast, even if a change in the network status is detected, no problem occurs in a sleeping communication apparatus, which is not sending any information, even when a long period of time passes. Accordingly, the predetermined time interval of transmitting connection confirmation information can be changed in accordance with the operating state of each communication apparatus.

DESCRIPTION OF THE PREFERRED EMBODIMENTS

The present invention will be understood from the following description of the preferred embodiments with reference to the accompanying drawings.

Example of Configuration of Wireless Network

Figure 1:
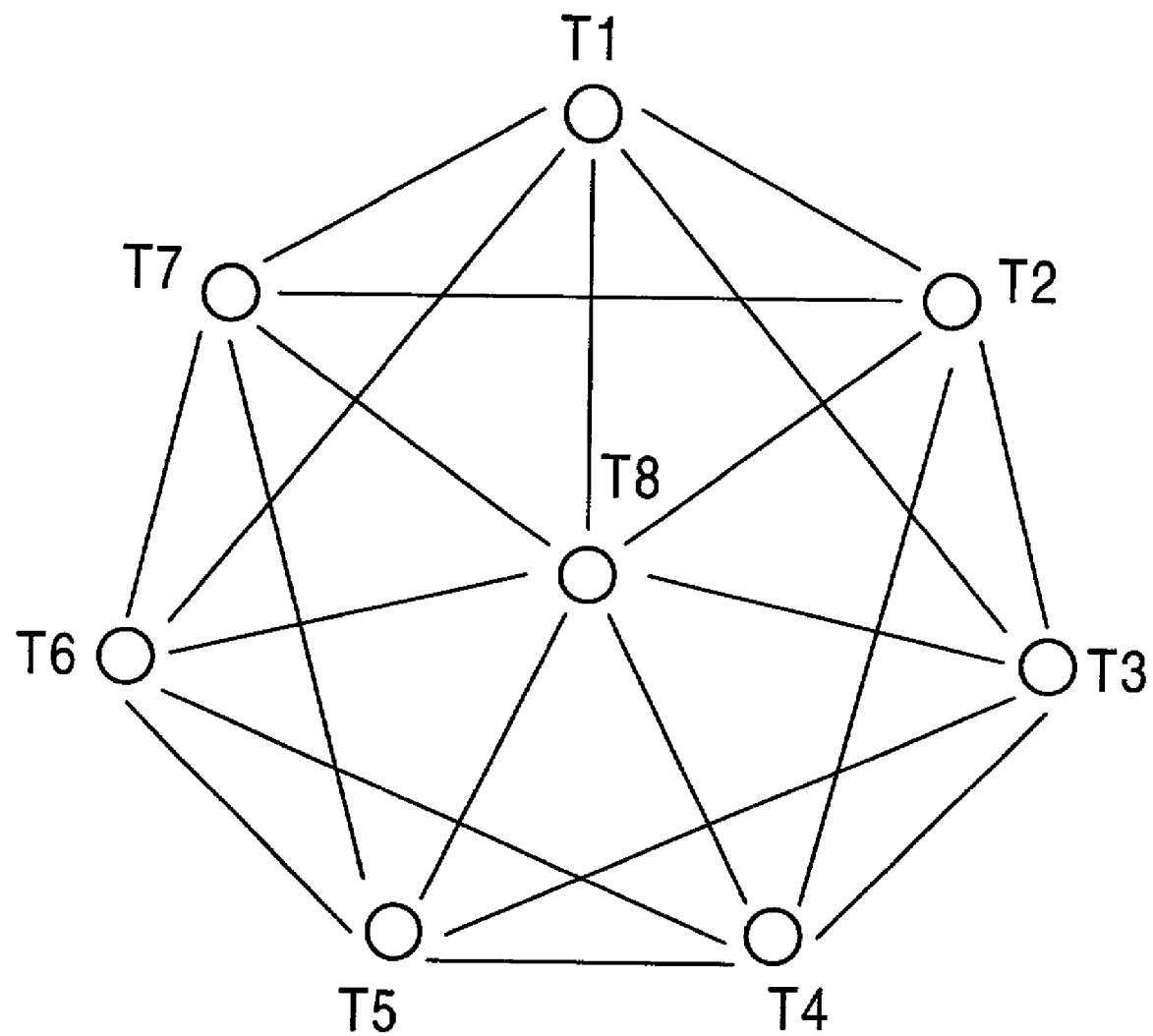
FIG. 1 illustrates an example of the configuration of a wireless network.

Referring to FIG. 1, a wireless network is formed by a plurality of communication apparatuses according to the present invention. Each communication apparatus is formed by a combination of a wireless transmitter and a wireless receiver.

FIG. 1 illustrates an example of the configuration of a wireless network system with a plurality of wireless communication apparatuses T1 to T8. Each of the communication apparatuses T1 to T8 is a wireless communication apparatus capable of transmitting and receiving signals by a predetermined transmission scheme.

In the example shown in FIG. 1, the communication apparatus T8 functions as a control station of the wireless network shown in FIG. 1. The rest of the wireless communication apparatuses T1 to T7 function as terminal stations belonging to the wireless network, and transmit and receive wireless signals to and from one another. The communication apparatus T8 can easily communicate with all the other communication apparatuses T1 to T7. Thus, the communication apparatus T8 is located at an appropriate position at which the communication apparatus T8, which is the control station, can transmit control information to the communication apparatuses T1 to T7, which are the terminal stations.

In the wireless network in the example shown in FIG. 1, each communication apparatus is not necessarily capable of directly and wirelessly communicating with all the other communication apparatuses. In the example shown in FIG. 1, for example, the communication apparatus T1 is located at a position relatively near the communication apparatuses T2, T7, and T8. Accordingly, the communication apparatus T1 can easily transmit information to the communication apparatuses T2, T7, and T8 since information will not be lost by wireless signal attenuation. In contrast, since the communication apparatus T1 is located at a position relatively far from the communication apparatuses T3 and T6, information transmission may become more or less difficult. Since the communication apparatus T1 is far from the communication apparatuses T4 and T5, the communication apparatus T1 cannot perform direct and wireless communication with the communication apparatuses T4 and T5.

Similarly, each of the other communication apparatuses T2 to T7 has a communication apparatus(es) to which information can be easily transmitted, a communication apparatus(es) to which information can be transmitted with difficultly, and a communication apparatus(es) to which information cannot be transmitted.

Example of Frame Structure

Figure 2:
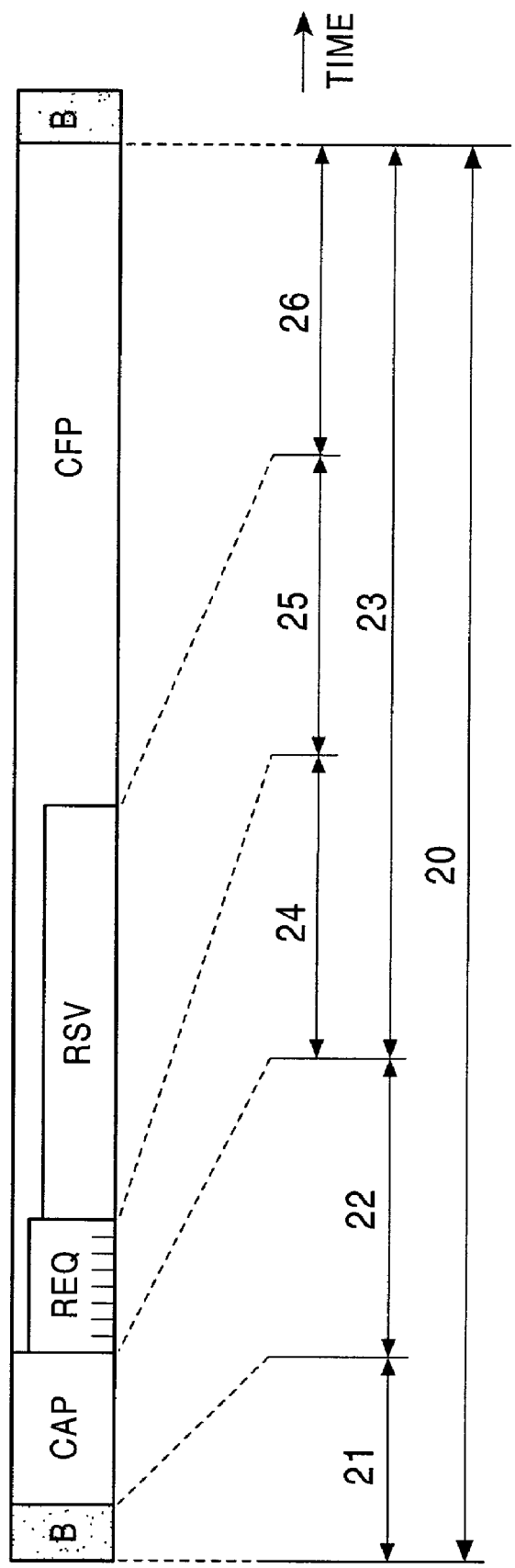
FIG. 2 illustrates an example of a wireless transmission frame structure.

FIG. 2 shows an example of a frame structure set by the control station (communication apparatus T8).

Referring to FIG. 2, a transmission frame period 20 includes a network broadcast area (B: Beacon) 21 which is broadcast from the control station over the network at the beginning of a frame; a contention access period (CAP) 22 in which processing when each communication apparatus enters the network is performed; and a contention free period (CFP) 23 in which a channel is allocated to each communication apparatus and each communication apparatus transmits information. The transmission frame period 20 ranges from the beginning of the network broadcast area (B: Beacon) 21 to the beginning of the next network broadcast area.

The contention free period 23 may include a request area (REQ) 24 in which a channel allocation request is transmitted; an allocated transmission area (RSV) 25 in which information is transmitted using an allocated channel; and an unused area 26 which is not used for transmission.

The foregoing frame structure is intended to illustrate an example, and hence the frame structure used by the wireless network system according to the present invention is not limited to this example.

The request area 24 is allocated as an area specific to each communication apparatus forming the network.

In this embodiment, each communication apparatus in the network sends "connection confirmation information" to the control station by using the request area 24, thereby enabling the control station of the network to detect whether each communication apparatus is connected or disconnected.

Alternatively, in order to prevent "channel allocation request information" and "connection confirmation information" from conflicting with each other in the request area 24, a plurality of frame periods can be used so that each communication apparatus can appropriately send connection confirmation information.

The fact that the "channel allocation request information" is received proves clearly that a connection is established between the corresponding communication apparatus and the control station. Thus, the communication apparatus can send the "connection confirmation information" only in a frame period in which the communication apparatus sends no "channel allocation request information".

Figure 3:
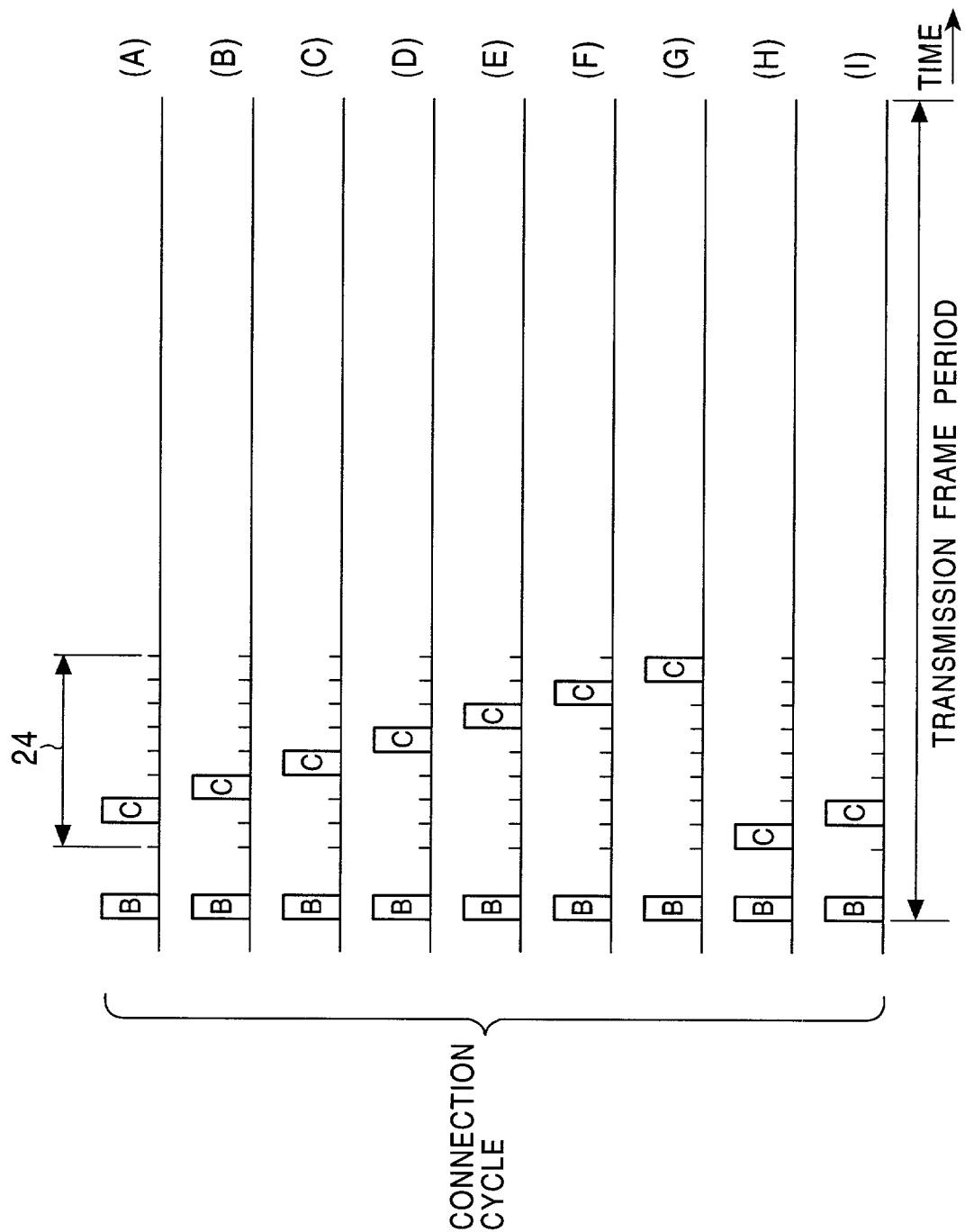
FIG. 3 illustrates a communication apparatus sending connection confirmation information.

FIG. 3 shows an example in which communication apparatuses send connection confirmation information using a plurality of frame periods. In this example, eight frames form one connection cycle. However, the present invention is not limited to this example. The number of frames forming one connection cycle is arbitrary. In each frame, the request area 24 is divided into a plurality of slots, which in this example are eight slots. The connection confirmation information is sent using any one of the slots.

Referring to FIG. 3, in a first frame period, a first communication apparatus uses a second slot in the request area 24 to send the "connection confirmation information" (portion (A) of FIG. 3). In a second frame period, a second communication apparatus uses a third slot to send the "connection confirmation information" (portion (B) of FIG. 3). In a third frame period, a third communication apparatus uses a fourth slot to send the "connection confirmation information" (portion (C) of FIG. 3). Similarly, in fourth to seventh frame periods, fourth to seventh communication apparatuses use fifth to eighth slots, respectively, to send the corresponding connection confirmation information (portions (D) to (G) of FIG. 3). In an eighth frame period, a communication apparatus newly entering the network uses a first slot to send the "connection confirmation information".

In a ninth frame period, as in the first frame period, the first communication apparatus again uses the second slot to send the "connection confirmation information". Accordingly, the connection status of a series of communication apparatuses can be reported in eight frames.

Figure 4:
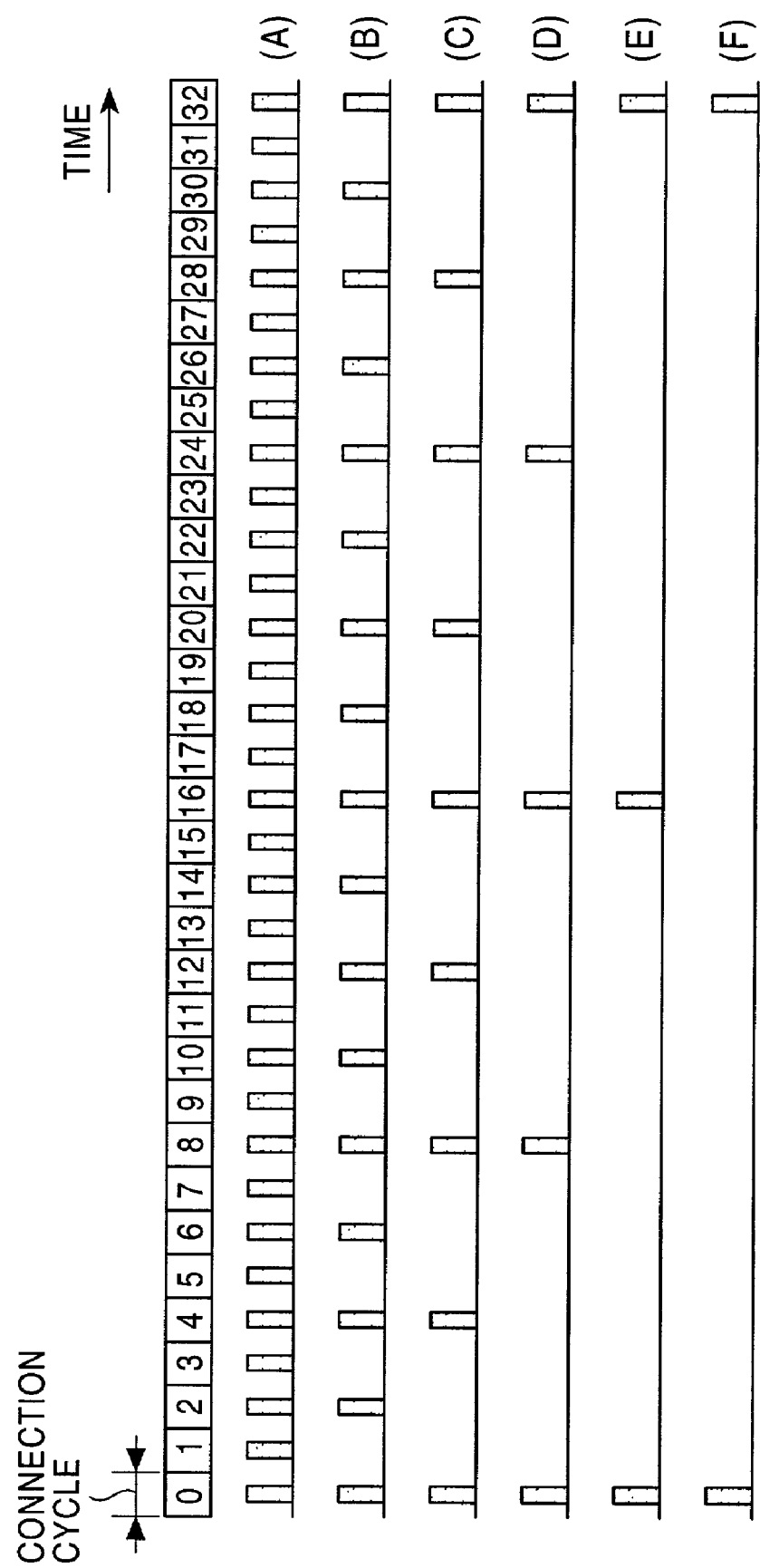
FIG. 4 illustrates a pattern of sending the connection confirmation information.

Example in which Interval of Sending Connection Confirmation Information is Variable FIG. 4 illustrates an example in which the above-described series of frame periods is defined as a "connection cycle", and an interval of reporting (or sending) connection confirmation information is set to have a variable length.

Referring to FIG. 4, a series of 33 connection cycles 0 to 32 is shown. Portions (A) to (F) show six cases in which the connection is confirmed at different intervals (or connection cycles).

In the case (A) at the top of FIG. 4, the communication apparatus sends connection confirmation information every connection cycle. Assuming that one connection cycle is 32 milliseconds, the case (A) corresponds to a method for sending, by the communication apparatus, the connection confirmation information to the control station once in every 32 milliseconds.

In the case (B), second from the top, the connection of the communication apparatus is confirmed every two connection cycles. In the case (B), the connection is confirmed once in every 64 milliseconds.

In the case (C), third from the top, the connection of the communication apparatus is confirmed every four connection cycles. Since one connection cycle is 32 milliseconds, the connection is confirmed once in every 128 milliseconds.

In the case (D), fourth from the top, the connection of the communication apparatus is confirmed every eight connection cycles. If one connection cycle is 32 milliseconds, the connection is confirmed once in every 256 milliseconds.

In the case (E), fifth from the top, the connection of the communication apparatus is confirmed every 16 connection cycles. If one connection cycle is 32 milliseconds, the connection is confirmed once in every 512 milliseconds.

In the case (F), sixth from the top, the connection of the communication apparatus is confirmed every 32 connection cycles. If one connection cycle is 32 milliseconds, the connection is confirmed once in every 1.024 seconds.

The pattern to be selected by each communication apparatus forming the wireless network of this embodiment can be preset in accordance with the operating state of each communication apparatus. One of the patterns shown in the portions (A) to (F) can be appropriately selected, and the connection confirmation can be performed. For example, when the communication apparatus is performing streaming transmission, the communication apparatus sends the connection confirmation information using the pattern (A). In contrast, if the communication apparatus is sending no information, the pattern (F) is selected. Thus, the communication apparatus enters a sleeping mode in the connection cycles 1 to 31 in which no connection confirmation information is transmitted.

The given numbers illustrate references for the foregoing cases and are not intended to limit the scope of the present invention.

Example of Configuration of Communication Apparatus

Figure 5:
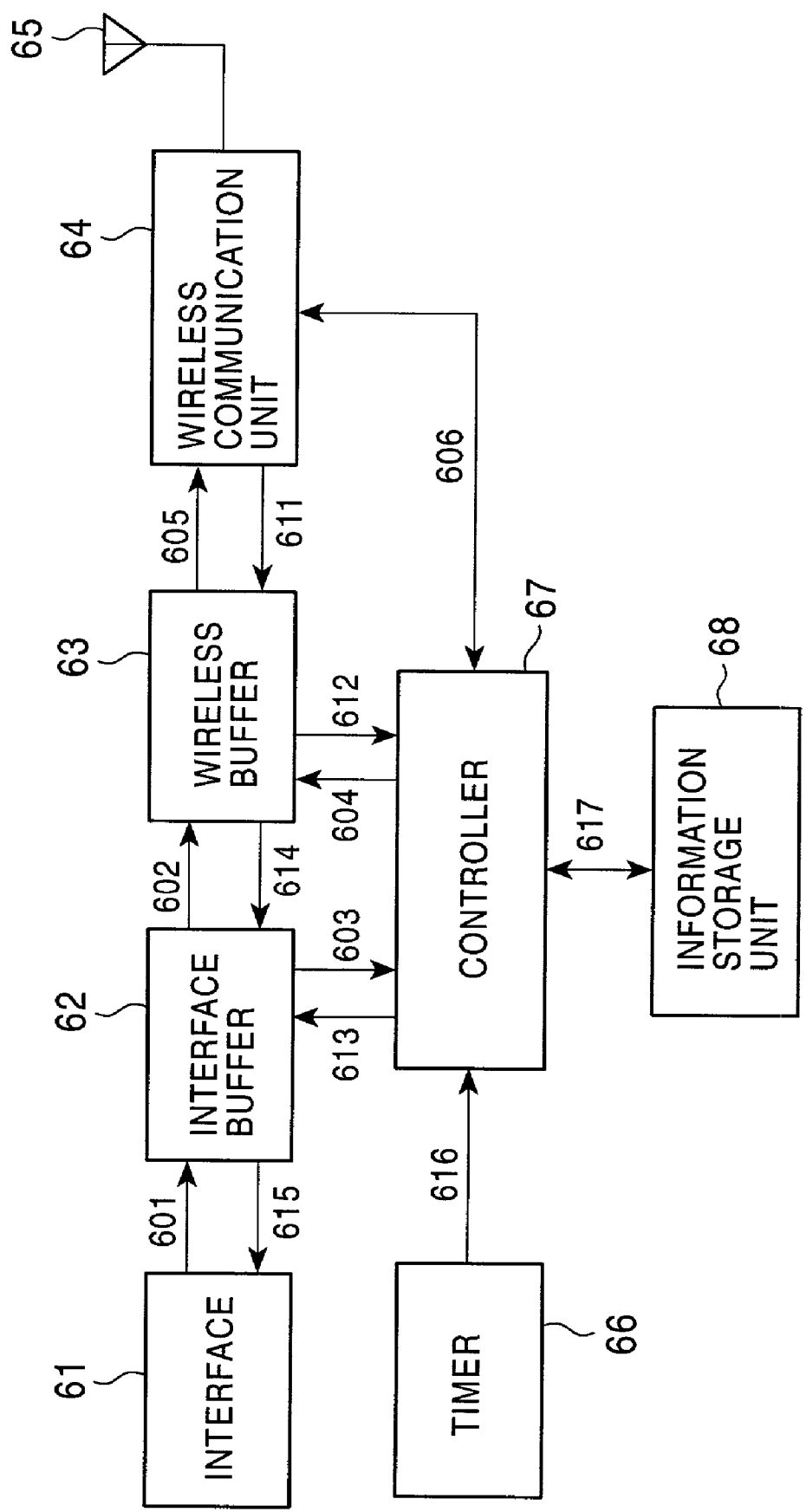
FIG. 5 is a block diagram of an example of the configuration of a wireless communication apparatus.

An example of the configuration of the communication apparatus capable of performing a connection confirmation method according to this embodiment will now be described. FIG. 5 shows the configuration of the wireless communication apparatus.

The wireless communication apparatus has an interface 61 for connecting to an external apparatus (not shown) and an interface buffer 62 for temporarily storing media information 601, which is wirelessly transmitted from the external apparatus. Also, the wireless communication apparatus has a wireless buffer 63 for storing information 602 transmitted from the interface buffer 62 as a wireless transmission packet.

The communication apparatus also has a controller 67 for performing a series of transmission processes. If it is determined from a wireless transmission notice 603 that it is necessary to transmit information using an allocated channel, a channel allocation request 604 is stored in the wireless buffer 63 for wireless transmission. By using a predetermined request area, a channel allocation request 605 is wirelessly transmitted to the control station through a wireless communication unit 64 from an antenna 65.

A signal received by the communication apparatus is supplied to the wireless communication unit 64 through the antenna 65 and is sent as a demodulated signal 611 to the wireless buffer 63.

Network broadcast information 612, which is periodically transmitted from the control station, is supplied to the controller 67. The controller 67 confirms corresponding channel allocation information and, in accordance with the information, sets the wireless communication unit 64, thereby transmitting the wireless transmission packet stored in the wireless buffer 63.

If the network broadcast information 612 specifies reception, the wireless communication unit 64 is set in accordance with the information 612, and a signal is received at a predetermined time.

If the information 611 is received, the information 611 is stored in the wireless buffer 63. The control station 67 reconstructs reception information 614 in accordance with the instruction 604 indicating the frame period unit and sends the reception information 614 to the interface buffer 62.

The reception information 614 is transferred as information 615 in a predetermined interface format through the interface 61 to the external apparatus (not shown).

When the control station 67 is to transmit the connection confirmation information to the control station of the network in a predetermined frame period, the controller 67 sets a reference frame in a connection cycle in accordance with time information included in the network broadcast information 612.

In accordance with the reference frame in the connection cycle, a frame in which the connection confirmation information of each communication apparatus is sent is set to a predetermined transmission frame.

The controller 67 has a function for determining the operating state of the communication apparatus and for determining, in accordance with the operating state, the variable-length transmission period during which the connection confirmation information is transmitted.

The controller 67 controls the wireless buffer 6:3 and the wireless communication unit 64 so that information can be transmitted using a predetermined slot (area) of a request area when the frame period, that is, the transmission period, arrives.

The communication apparatus has a timer 66 for timing the connection cycle and the frame period. When a predetermined time arrives, the timer 66 sends time information 616 to the controller 67.

The controller 67 has a function for transmitting the connection confirmation information in accordance with the time information 616.

A series of control processes is performed by instructions given by the controller 67. The controller 67 is connected to an information storage unit 68 for storing various transmission control programs and control information.

The configuration of the control station of the wireless network is substantially the same as that shown in FIG. 5. The control station can be formed to be capable of operating both as the control station and as a communication apparatus functioning as a terminal station. When the communication apparatus operates as the control station, the communication apparatus does not need to establish a connection with an external apparatus. Hence, the interface 61 and the interface buffer 62 become unnecessary. Also, the controller 67 is designed to perform functions of the control station, including a function for allocating network resource and a function for managing channel allocation requests.

Operation of Communication Apparatus

Figure 6:
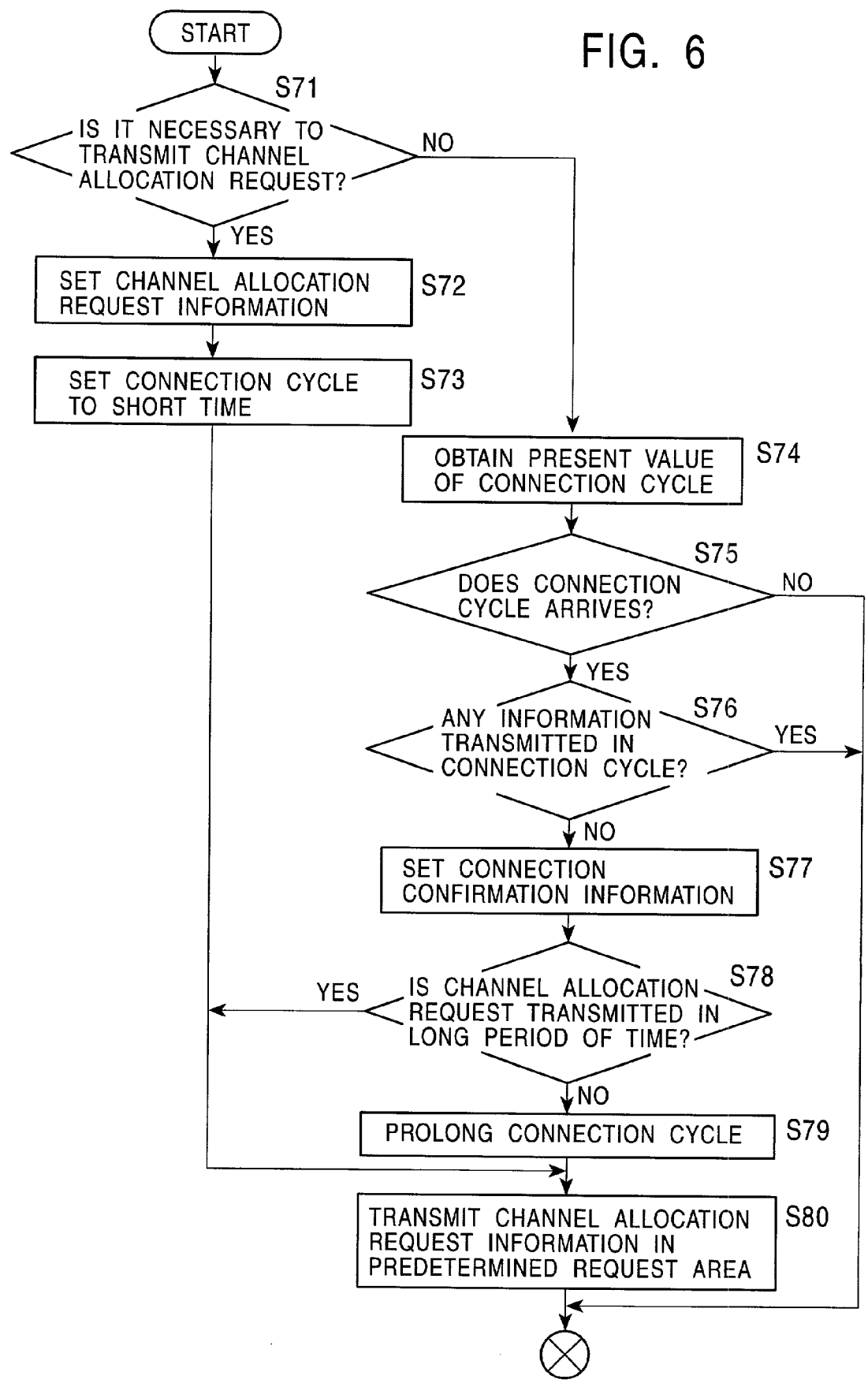
FIG. 6 is a flowchart showing a connection confirming process performed by a terminal station.

FIG. 6 is a flowchart showing the connection confirmation operation of the communication apparatus functioning as the terminal station of the wireless network.

Each of the communication apparatuses included in the network, excluding the control station, determines whether it is necessary to transmit a channel allocation request to the control station in order to transmit information (step S71).

If it is necessary to transmit a channel allocation request, parameters of the corresponding channel allocation request are set, and channel allocation request information is set (step S72). A connection cycle is set to a short period of time, thereby setting an active state (step S73). Subsequently, the communication apparatus sends the channel allocation request information to the control station in a predetermined request area in a frame period (step S80).

If it is determined in step S71 that it is unnecessary to send a channel allocation request, a preset value of the connection cycle of the communication apparatus is obtained (step S74).

The communication apparatus determines whether the connection cycle during which the connection confirmation information is transmitted to the control station arrives (step S75). If the determination is negative, the processing is terminated.

If the determination is affirmative, it is determined whether or not any information is transmitted to the control station in the connection cycle (step S76). If information such as a channel allocation request is sent by the communication apparatus, the communication apparatus exits from the processing. Accordingly, the control station can confirm that the communication apparatus is connected to the wireless network.

In contrast, if no information is sent by the communication apparatus, the communication apparatus is required to perform connection confirmation with the control station. Thus, the communication apparatus sets the connection confirmation information (step S77).

In order to check the operating state of the communication apparatus, it is determined whether the communication apparatus has sent a channel allocation request in a long period of time (step S78). If the communication apparatus has not sent a channel allocation request in a long period of time, the pattern of sending the connection confirmation information is changed so that the interval of sending the connection confirmation information can be prolonged (step S79). In the example shown in FIG. 4, if the current transmission pattern is (A), the transmission pattern (A) can be changed to the pattern (B) in which the interval of sending the connection confirmation information is prolonged. If the pattern (C) is currently set, the pattern (C) can be changed to the pattern (D).

The connection confirmation information is sent to the control station at an allocated slot in a predetermined request area of the frame period (step S80).

Operation of Control Station

Figure 7:
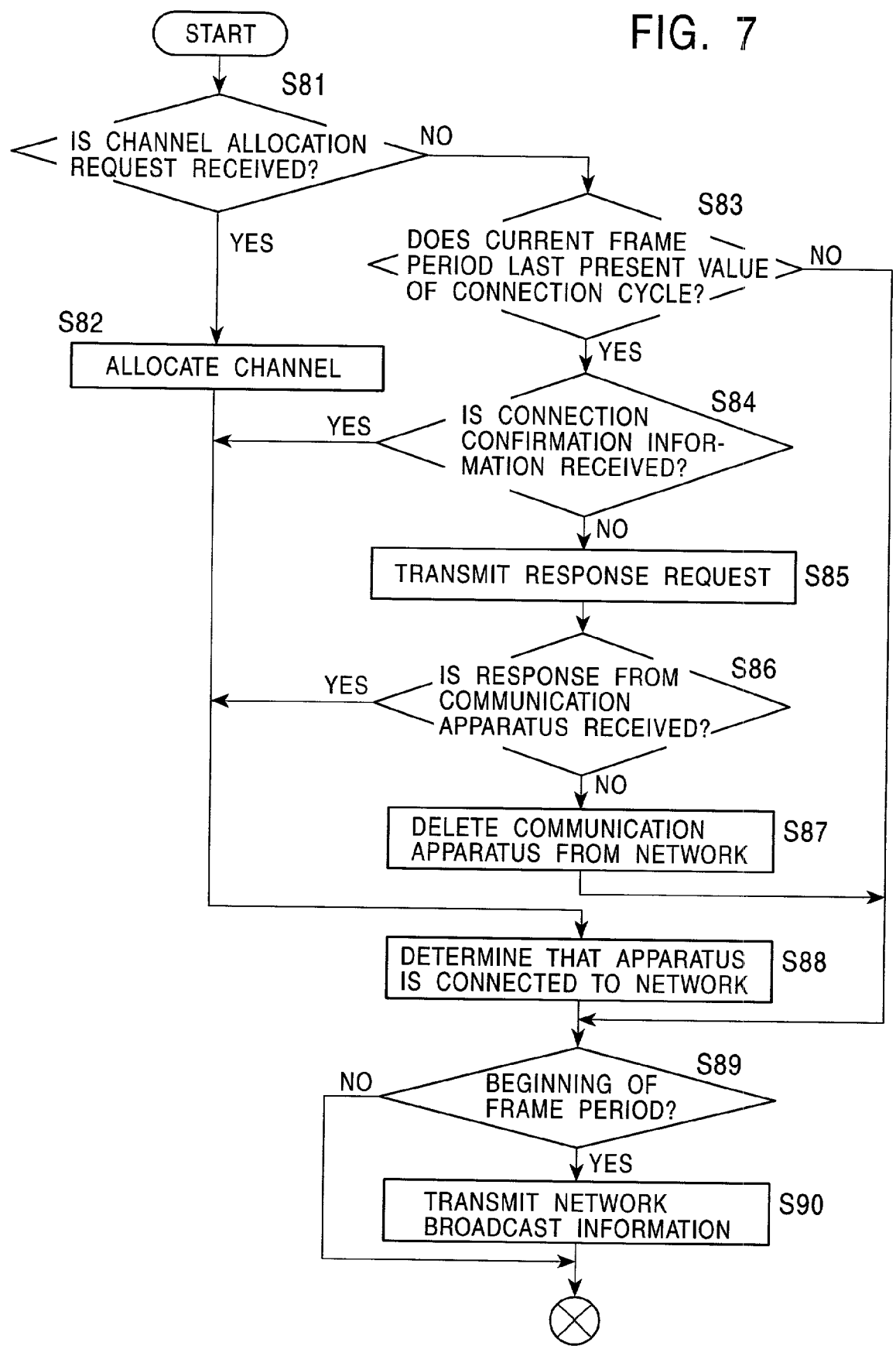
FIG. 7 is a flowchart showing a connection confirming process performed by a control station.
Figure 8:
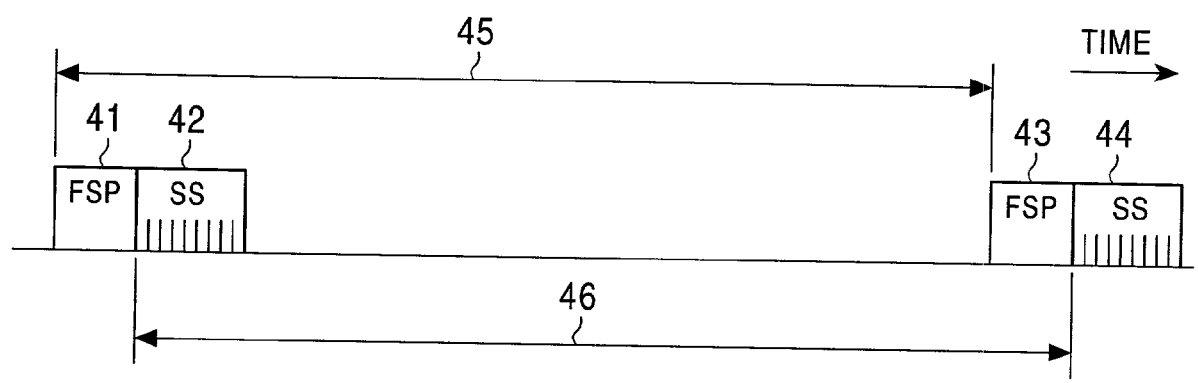
FIG. 8 illustrates an example of a known wireless transmission frame.

The operation of the control station of the wireless network according to this embodiment will now be described. FIG. 7 is a flowchart showing the connection confirmation operation of the communication apparatus functioning as the control station of the wireless network.

The communication apparatus functioning as the control station of the network determines whether or not the control station has received a channel allocation request transmitted from each communication apparatus in the network in order to send information (step S81).

If the control station has received a channel allocation request, the control station allocates a channel in accordance with the corresponding channel allocation request (step S82) and determines that the communication apparatus that has sent the corresponding channel allocation request is connected to the network (step S88).

If it is determined in step S81 that the control station has received no channel allocation request, the control station determines whether or not the current frame period lasts a preset time period, which is set as a connection cycle for the communication apparatus (step S83).

If the current frame period lasts the time period set as the connection cycle, it is determined whether or not the connection confirmation information is received (step S84). If the connection confirmation information is received, it is determined that the communication apparatus is connected to the network (step S88).

In contrast, if no connection confirmation information is received, the control station sends a response request to the corresponding communication apparatus in order to determine whether a connection is established with the corresponding communication apparatus (step S85).

Subsequently, it is determined whether or not a response from the communication apparatus is received (step S86). If a response is received, it is determined that the communication apparatus is connected to the network (step S88). In contrast, if no response is received, it is determined that the corresponding communication apparatus is disconnected, and the communication apparatus is deleted from the wireless network (step S87). More specifically, the communication apparatus is deleted from a table describing communication apparatuses (including the communication apparatus to be deleted) belonging to the wireless network, which is formed by a controller for deleting the communication apparatus. The control station proceeds to step S89.

In step S89, the control station determines whether or not the beginning of the frame period is reached. If the determination is affirmative, the control station transmits network broadcast information (step S90).

What is claimed is:

1. A wireless communication system, comprising:
    a control station; and
    at least one wireless communication apparatus for performing connection confirmation with the control station, wherein
    the wireless communication apparatus transmits connection confirmation information to the control station at a predetermined interval by using a portion of a management field of a transmission frame;
    the transmission frame includes the management field and a data field;
    the portion of the management field is divided into a plurality of slots, each slot being assigned independently to each wireless communication apparatus for sending the connection confirmation information;
    the control station detects the connection confirmation information, whereby a connection status of the wireless communication apparatus is monitored; and
    the interval of transmitting the connection confirmation information is changed in accordance with an operating state of the wireless communication apparatus.

2. A wireless communication method for performing connection confirmation between a control station and at least one wireless communication apparatus, the method comprising the steps of:
    determining an interval of transmitting connection confirmation information, the determining being performed by the wireless communication apparatus; and
    transmitting the connection confirmation information to the control station by using a portion of a management field of a transmission frame, the transmitting being performed by the wireless communication apparatus, wherein the transmission frame includes the management field and a data field;

the portion of the management field is divided into a plurality of slots, each slot being assigned independently to each wireless communication apparatus for sending the connection confirmation information; and the interval of transmitting the connection confirmation information is changed in accordance with an operating state of the wireless communication apparatus.

3. The wireless communication method according to claim 2, wherein the area allocated independently to each wireless communication apparatus includes any one area in a frame period of a connection cycle formed by a series of continuous frame periods, the included area corresponding to the wireless communication apparatus.

4. The wireless communication method according to claim 2, wherein the wireless communication apparatus transmits the connection confirmation information once in each N connection cycles in a series of continuous connection cycles, wherein N is an integer greater than or equal to 1.

5. The wireless communication method according to claim 2, wherein when a transmission packet from the wireless communication apparatus belonging to a network formed by the control station is detected the connection confirmation information from the wireless communication apparatus is received.

6. The wireless communication method according to claim 2, wherein the control station monitors a connection status of the wireless communication apparatus by detecting the connection confirmation information transmitted at the interval from the wireless communication apparatus forming a network.

7. A wireless communication apparatus used as a control station of a wireless network, the apparatus comprising:

wireless communication means for transmitting a signal for identifying the wireless network and for receiving a signal from an other wireless communication apparatus belonging to the wireless network;

timing means for timing a predetermined time interval; and an information storage unit for storing the predetermined time interval for each wireless communication apparatus included in the wireless network, wherein the predetermined time interval is variable and is a threshold for determining whether a connection is established;

a transmission frame sent from the wireless communication apparatus includes a management field and a data field; and a portion of the management field is divided into a plurality of slots, each slot being assigned independently to each wireless communication apparatus for sending the communication confirmation information.

8. The wireless communication apparatus according to claim 7, further comprising a controller for deleting the other wireless communication apparatus included in the wireless network when no signal is transmitted from the wireless communication apparatus in the predetermined time interval.

9. A wireless communication apparatus for performing connection confirmation with a control station, the apparatus comprising:

wireless communication means for receiving a signal from the control station and for transmitting connection confirmation information to the control station by using a portion of a management field of a transmission frame; and timing means for timing a predetermined time interval, wherein the predetermined time interval is variable in accordance with an operating state of the wireless communication apparatus;

the transmission frame includes the management field and a data field; and the portion of the management field is divided into a plurality of slots, each slot being assigned independently to each wireless communication apparatus for sending the connection confirmation information.

10. The wireless communication apparatus according to claim 9, wherein the area allocated independently to each wireless communication apparatus includes any one area in a frame period of a connection cycle formed by a series of continuous frame periods, the included area corresponding to the wireless communication apparatus.

11. The wireless communication apparatus according to claim 9, further comprising a controller for controlling the wireless communication means to send the connection confirmation information to the control station at the predetermined time interval when no information is transmitted in the predetermined time interval.

* * * * *